United States Patent
Fujiwara

(10) Patent No.: US 7,333,226 B2
(45) Date of Patent: Feb. 19, 2008

(54) PROGRAM DISTRIBUTION FROM A PROGRAM DISTRIBUTION SOURCE TO AN IMAGE FORMING APPARATUS

(75) Inventor: Akihiko Fujiwara, Yokohama (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 965 days.

(21) Appl. No.: 10/368,455

(22) Filed: Feb. 20, 2003

(65) Prior Publication Data

US 2004/0165204 A1    Aug. 26, 2004

(51) Int. Cl.
    *G06F 15/00* (2006.01)
(52) U.S. Cl. .................. 358/1.15; 358/1.16; 399/75
(58) Field of Classification Search ........... 358/1.15, 358/1.16; 399/75
    See application file for complete search history.

(56) References Cited

U.S. PATENT DOCUMENTS

| | | | | |
|---|---|---|---|---|
| 6,094,548 A * | 7/2000 | Gunning et al. | ............... | 399/75 |
| 6,094,698 A * | 7/2000 | Namikawa | ................... | 710/74 |
| 6,298,349 B1 * | 10/2001 | Toyoshima et al. | ......... | 707/100 |
| 7,137,113 B2 * | 11/2006 | Watanabe et al. | ........... | 717/168 |
| 7,225,251 B2 * | 5/2007 | Suzuki | ....................... | 709/224 |
| 2002/0140966 A1 * | 10/2002 | Meade et al. | ............... | 358/1.15 |
| 2003/0117668 A1 * | 6/2003 | Takeuchi | .................... | 358/463 |
| 2004/0030768 A1 * | 2/2004 | Krishnamoorthy et al. | . | 709/223 |
| 2004/0156065 A1 * | 8/2004 | Suzuki | ....................... | 358/1.13 |
| 2005/0206945 A1 * | 9/2005 | Kumazawa | ................ | 358/1.14 |

FOREIGN PATENT DOCUMENTS

| | | |
|---|---|---|
| JP | 10-301800 A | 11/1998 |
| JP | 11-272471 A | 10/1999 |
| JP | 11-331468 A | 11/1999 |

\* cited by examiner

*Primary Examiner*—Twyler Lamb
*Assistant Examiner*—Mark R. Milia
(74) *Attorney, Agent, or Firm*—Foley & Lardner LLP

(57) ABSTRACT

An image forming apparatus receives, from a server connected to a network, a notification that a module operating units composing the apparatus can be added. The apparatus requests distribution of a program including the module to the server. Further, when a function of the module can be realized from information of the module stored in each hierarchy composing the program of the apparatus acquired each predetermined period and information of main and option devices, the server transmits program distributing information including the module. The device stores the module in an area of a predetermined hierarchy on the basis of the program distributing information.

6 Claims, 12 Drawing Sheets

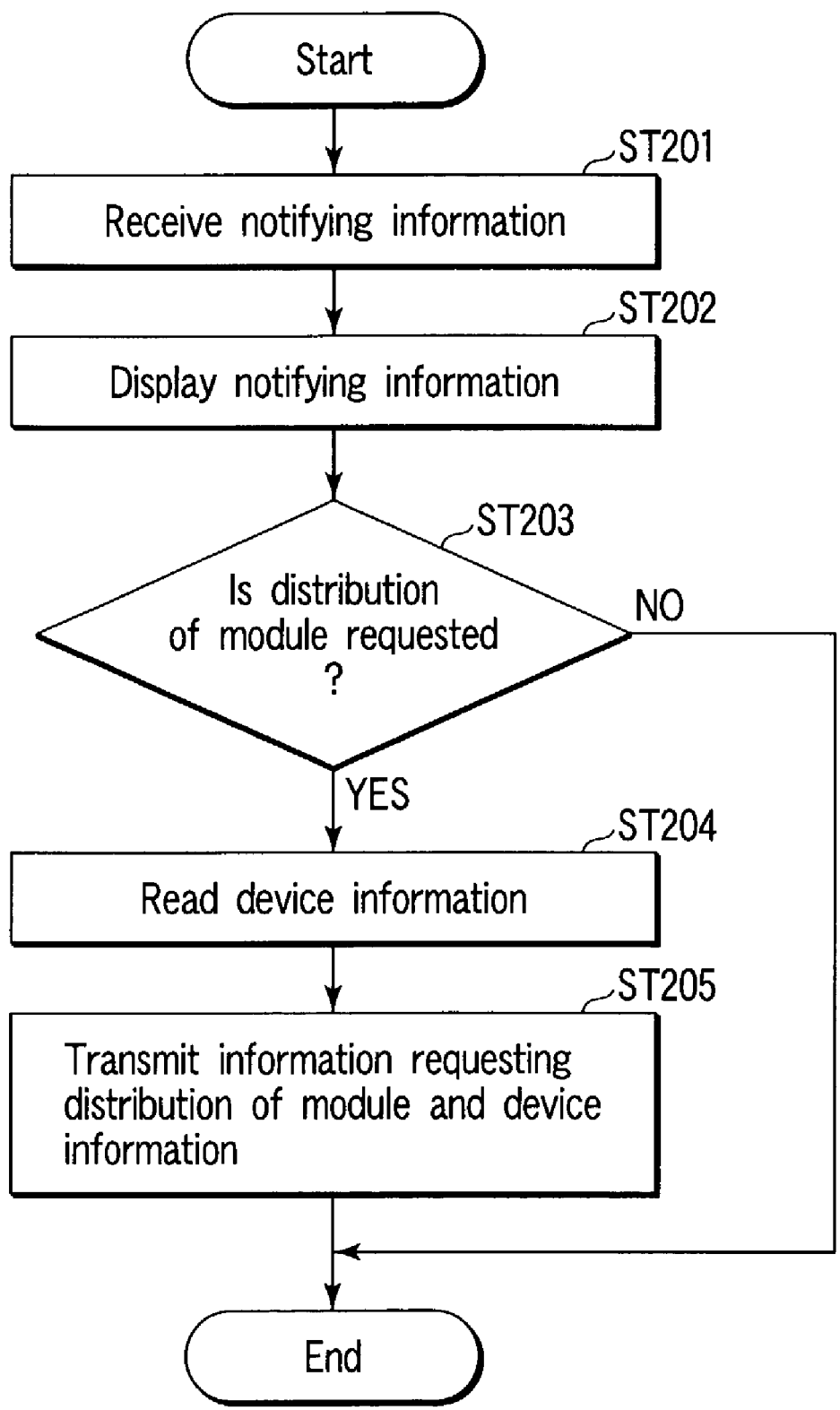
F I G. 5

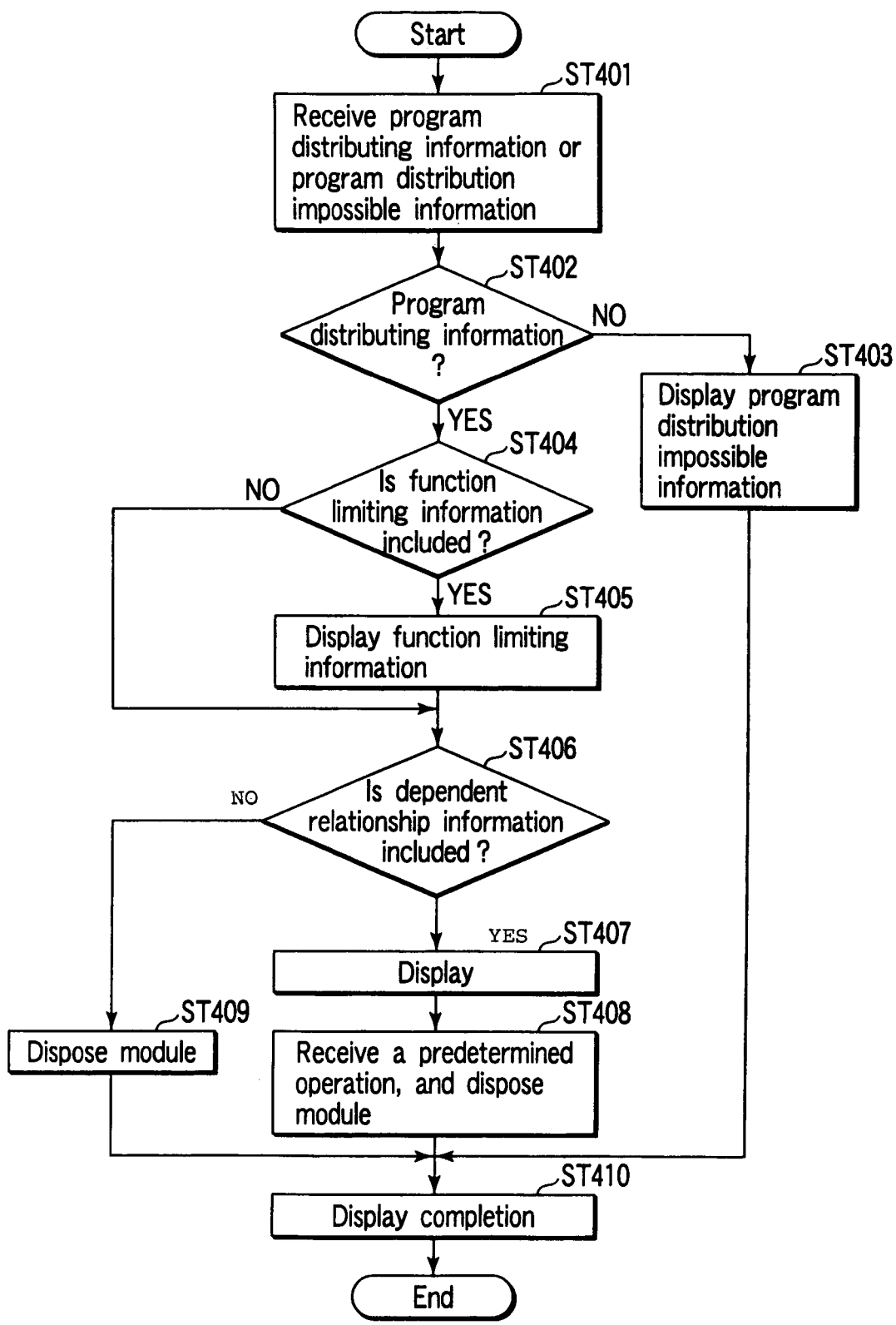
F I G. 7

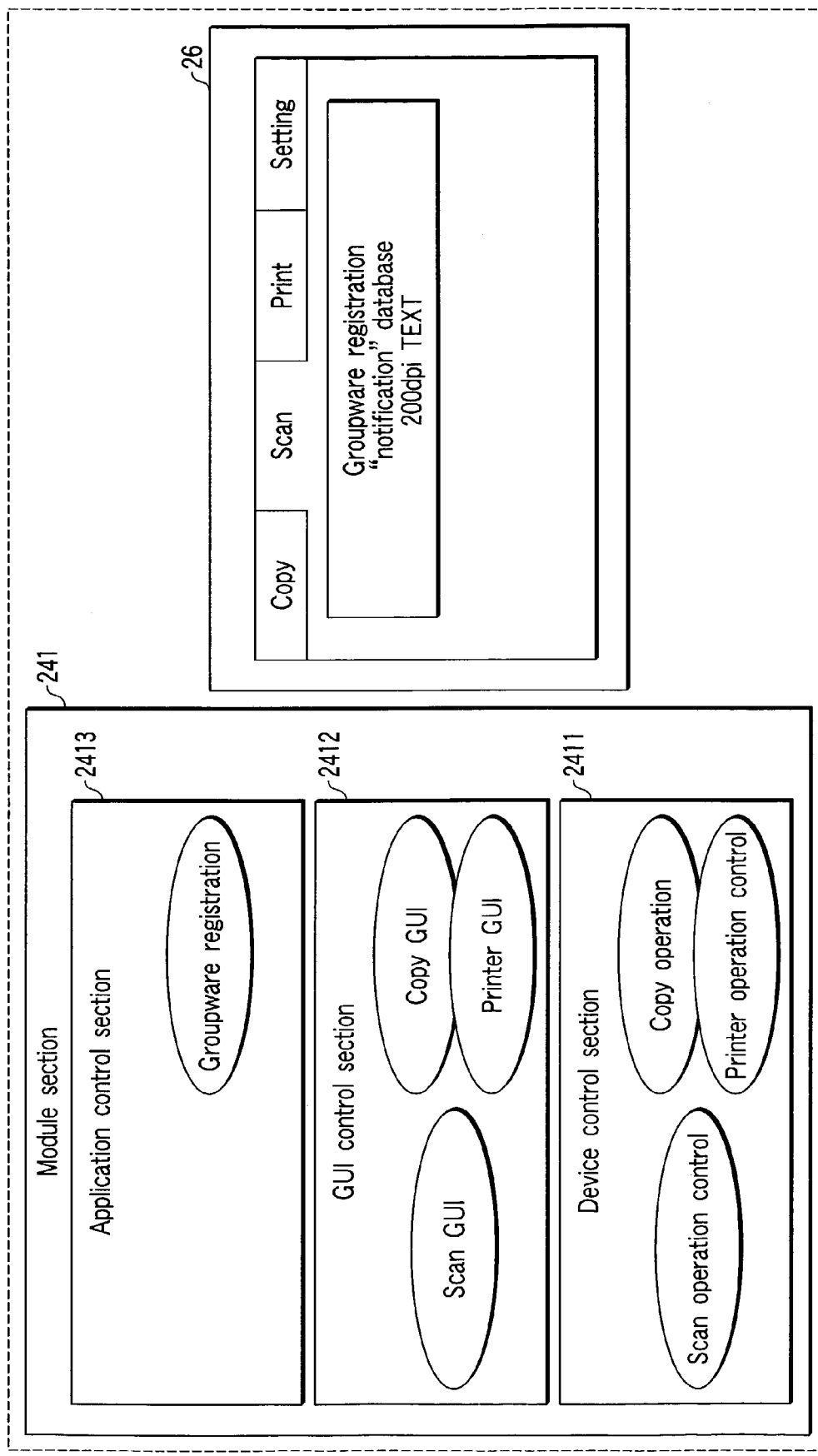
F I G. 12

PROGRAM DISTRIBUTION FROM A PROGRAM DISTRIBUTION SOURCE TO AN IMAGE FORMING APPARATUS

BACKGROUND OF THE INVENTION

1. Field of the Invention

The present invention relates to an image forming apparatus in which a program is distributed via a network from a program distributing source.

2. Description of the Related Art

In recent years, image forming apparatuses having a plurality of functions, such as a function for connecting to a network or the like in addition to a function for forming an image, have been increasing. Such an image forming apparatus is realized by executing a program in which respective functions are stored in a storage section. However, there are cases in which some problems arise in the program while the apparatus is being used, and there are cases in which the functions by the program can no longer be realized. Further, there are cases in which a new function using hardware resources, such as a device which was provided in advance in the aforementioned apparatus, an attached option device, or the like, is added. In any of these cases, it is necessary to update the predetermined program in the apparatus.

Therefore, for example, as disclosed in Jpn. Pat. Appln. KOKAI Publication No. 10-301800, the user of the image forming apparatus downloads a program by a personal computer (PC) connected to the image forming apparatus, and thereafter, updates the program, or the like. Further, for example, as disclosed in Jpn. Pat. Appln. KOKAI Publication No. 11-272471, there is a method in which devices, software configurations, or the like of respective image forming apparatuses connected to a network are stored in advance in a server, and the necessary programs are downloaded.

However, in the former method, machines such as a PC connected to the image forming apparatus or the like are necessary in order to update the program in the image forming apparatus. Also, in the latter method, because the software configuration and the attached option configuration in the image forming apparatus are complex, the operation environment data thereof and the software configuration information increase. If the server attempts to acquire and manage all of the information, the burden on the network becomes large.

Accordingly, there is the need for an image forming apparatus and a program distributing method which can carry out distribution of a program from a network without other machines being interposed, and which can reduce the burden on the network.

BRIEF SUMMARY OF THE INVENTION

According to an aspect of the present invention, there is provided an image forming apparatus comprising: a module section which stores a program for realizing functions of respective units composing the image forming apparatus so as to be divided into modules corresponding to each predetermined hierarchy; a device information managing section which stores information relating to the modules stored in the module section and information relating to the units; a connecting section which connects a program including modules which operate the units connected to a network, so as to be able to be received from an exterior; an informing section which, when notifying information is received from the connecting section, informs contents of the notifying information; an operating section which receives an operation of transmitting, to a program distributing source, distribution requesting information requesting distribution of the modules; and an information analyzing section which, when program distributing information including the modules is received from the exterior via the connecting section, analyzes to which hierarchy of the module section a module included the program distributing information is stored, and stores the module on the basis of the analyzed results. Further, the connecting section transmits operation requesting information requesting an operation of whether or not distribution of a module operating the unit is necessary to the respective image forming apparatuses, and information of a device which is necessary for realizing a function of the module, and receives notifying information having described therein contents that an operation of requesting distribution of the module configured to be able to realize the function is to be carried out.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

FIG. 5 is a flowchart showing processing which the MFP executes.

FIG. 7 is a flowchart showing some other processing which the MFP executes.

FIG. 12 is a diagram showing a case where a function is added to FIG. 10.

DETAILED DESCRIPTION OF THE INVENTION

Hereinafter, an embodiment of the present invention will be described with reference to the drawings. Note that the case where the present invention is applied to a multifunction peripheral (MFP) having various functions in addition to the function of forming an image will be described.

Figure 1:
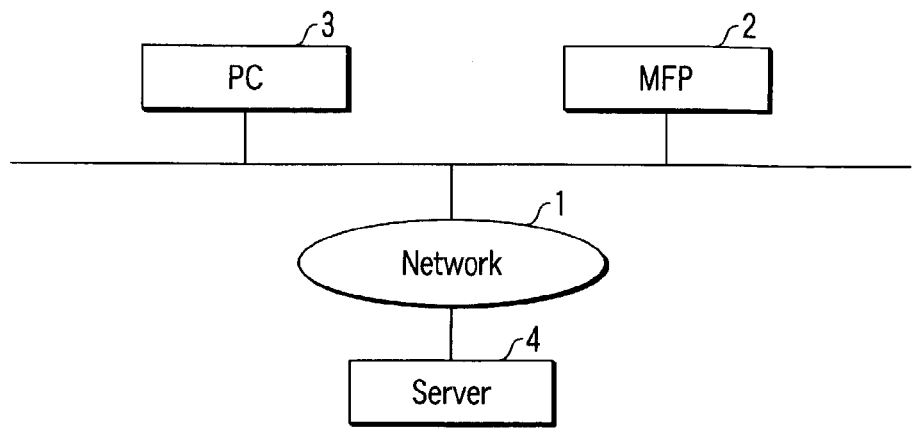
FIG. 1 is a diagram showing a network configuration in an embodiment of the present invention.

As shown in FIG. 1, an MFP 2, a personal computer (PC) 3, and a server 4 are connected to a network 1. A plurality of MFPs which are not illustrated are connected to the network. The server 4 carries out collection or the like of information by communicating with the other MFPs and the PC 3 via the network 1, and carries out management or the like of the machines connected to the network 1.

Figure 2:
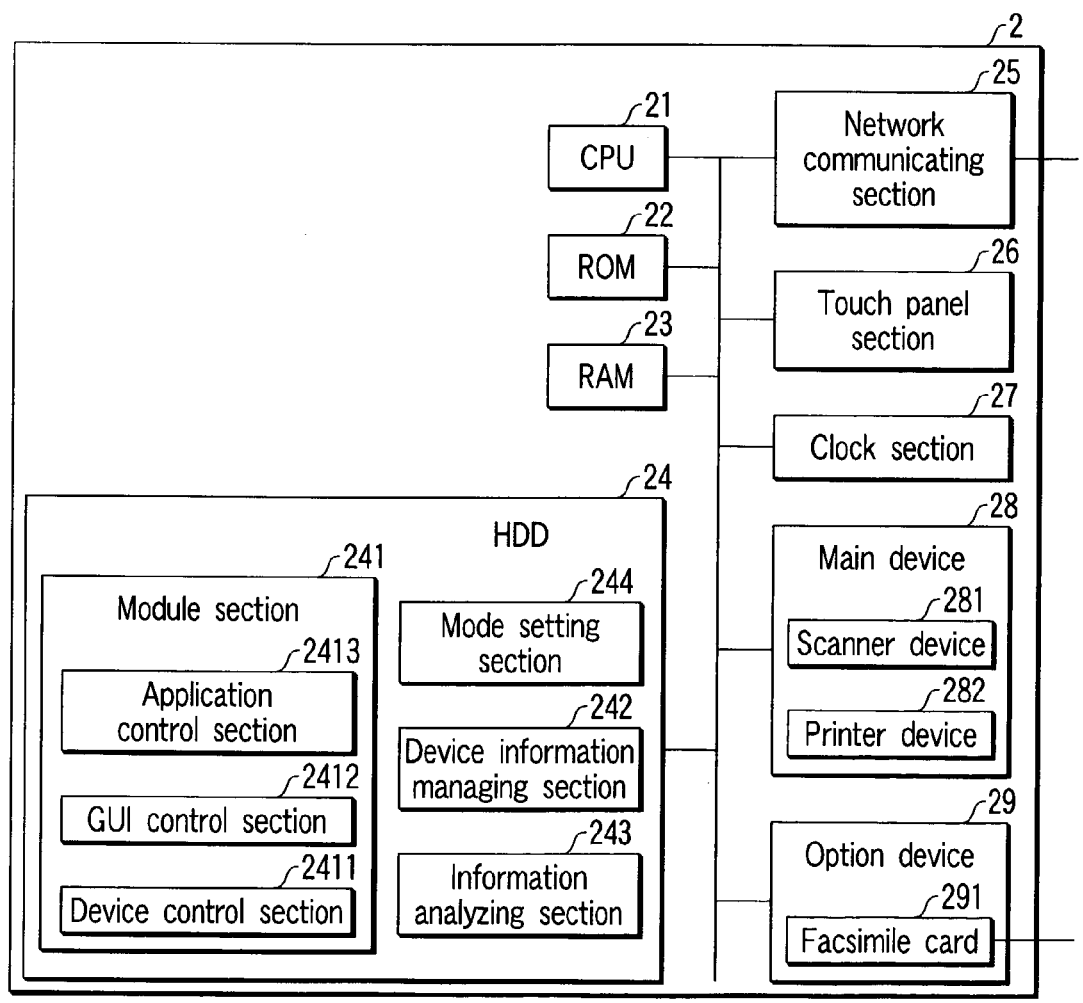
FIG. 2 is a diagram showing a configuration of an MFP.

First, the configuration of the MFP 2 will be described. In the MFP 2, as shown in FIG. 2, a CPU 21, a ROM 22, a RAM 23, a hard disk drive (HDD) 24, a network communicating section 25, a touch panel section 26, a clock section 27, a main device 28, and an option device 29 are provided. Further, the CPU 21, the ROM 22, the RAM 23, the HDD 24, the network communicating section 25, the touch panel section 26, the clock section 27, the main device 28, and the option device 29 are connected via bus lines.

The CPU 21 controls the MFP 2 overall by executing programs stored in the ROM 22. Further, the CPU 21 controls devices and the like provided in the MFP 2 by executing programs stored in the HDD 24. Programs which the CPU 21 executes and the like are stored in the ROM 22. The RAM 23 is used as a work area when the CPU 21 executes the programs stored in the ROM 22 and the HDD 24, or the like.

Various data and programs which the CPU 21 executes and the like are stored in the HDD 24. A module section 241, a device information managing section 242, an information analyzing section 243, a mode setting section 244, and the like are provided in the HDD 24. Moreover, a device control section 2411, a graphical user interface (GUI) control section 2412, and an application control section 2413 are provided in the module section 241.

The device control section 2411 stores therein a device control module, which is a module for controlling operations of hardware provided in the main device 28 and the option device 29. The GUI control section 2412 stores therein a GUI control module, which is a module for controlling the GUI presented on the touch panel section 26 for the user. The application control section 2413 stores therein an application control module which is a module for controlling specific functions in cooperation with the device control module and the GUI control module which are respectively stored at the device control section 2411 and the GUI control section 2412, and in some cases, in cooperation with, for example, applications existing in the PC 3 connected to the network 1.

Note that a module is a unit composing a program, and is stored so as to be classified into the hierarchies of the device control section 2411, the GUI control section 2412, and the application control section 2413. The program for realizing the operations of the unit of the above-described MFP 2 is configured from one module or a combination of a plurality of modules. Namely, a program for providing a specific function is configured from a module which is used in common for a plurality of functions or a module which is used only for a specific function, or a combination of these modules.

The device information managing section 242 stores therein device information such as information (for example, the manufacturers, the versions, the performance, or the like) relating to the devices attached to the main device 28 and the option device 29 of the MFP 2, information relating to modules which are respectively stored in the device control section 2411, the GUI control section 2412, and the application control section 2413.

The information analyzing section 243 analyzes, for example, the contents of program distributing information distributed from the server 4 connected to the network 1 in units of modules. Further, the information analyzing section 243 stores the module in a predetermined control section on the basis of the analyzed results, and carries out relating which is for making the module, along with the modules stored in the other control sections, function as one program.

The mode setting section 244 stores settings of various operating modes of the MFP 2.

In the network communicating section 25, for example, a network interface card (NIC) is provided. In accordance therewith, the MFP 2 can communicate with the server 4 connected to the network 1.

The touch panel section 26 is formed from, for example, a liquid crystal touch panel. At the touch panel section 26, a displaying section giving notice of information which is necessary for the user and an inputting section receiving instructions from the user are provided. On the touch panel section 26, for example, the items, "Copy", "Scan", "Print", "Setting" are displayed. When an item is selected by the user, the function of the item is displayed. Further, when the user touches the display, the function is executed.

The clock section 27 generates time information. Further, the clock section 27 carries out clocking of a predetermined period of time on the basis of an instruction from the CPU 21.

At the main device 28, a scanner device 281 and a printer device 282 are provided. The scanner device 281 reads, by a line sensor (not shown), an image of an original stored in a predetermined position, and generates image information of the original by applying various kinds of image processing. The printer device 282 is formed from, for example, an exposure device, a photosensitive body, a developing device, a transfer device, a fixing device, a cleaning device, a paper conveying mechanism, and the like which are not illustrated. The printer device 282 are configured to, for example (not shown), exposure unit, photosensitive drum, developer unit, transfer unit, fixing unit, cleaning unit, paper conveyance mechanism, and the like. The printer device 282 forms an image on paper on the basis of the image information.

At the option device 29, various types of option devices, for example, an automatic document feeder (ADF), a finisher, a facsimile card, and the like are attached in accordance with the type of the MFP 2. In the case of the MFP 2, a facsimile card 291 is attached as an option device. In accordance therewith, the MFP 2 can carry out facsimile communication with a device having a facsimile function connected to the network 1.

Figure 3:
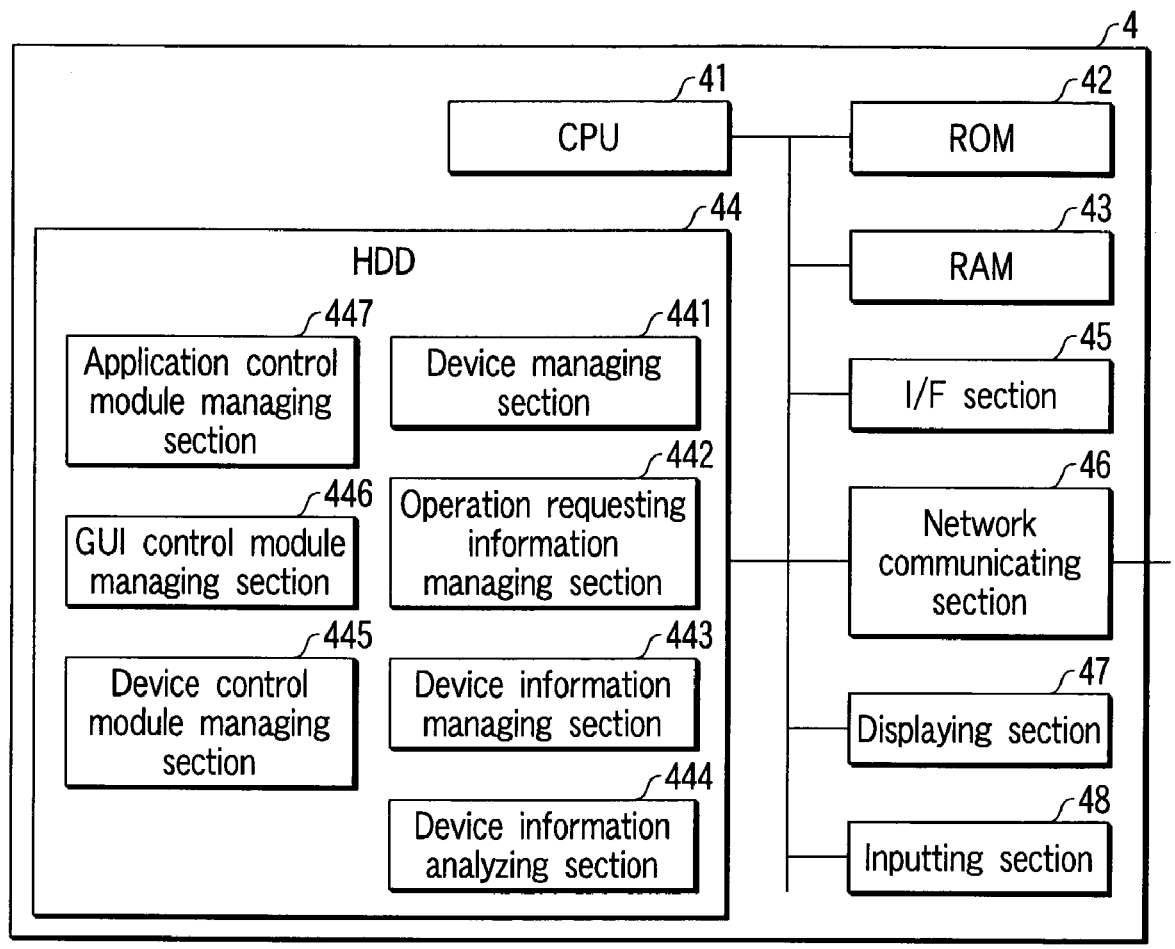
FIG. 3 is a diagram showing a configuration of a server.

Next, the configuration of the server 4 will be described. As shown in FIG. 3, in the server 4, a CPU 41, a ROM 42, a RAM 43, a HDD 44, an interface (I/F) section 45, a network communicating section 46, a displaying section 47, and an inputting section 48 are provided. The CPU 41, the ROM 42, the RAM 43, the HDD 44, the I/F section 45, the network communicating section 46, the displaying section 47, and the inputting section 48 are connected via bus lines.

The CPU 41 controls the server 4 overall by executing programs stored in the ROM 42. Further, the CPU 41 controls devices and the like by executing programs stored in the HDD 44. Programs and the like which the CPU 41 executes are stored in the ROM 42. The RAM 43 is used as a work area when the CPU 41 executes the programs stored in the ROM 42 or the HDD 44 or the like.

In the HDD 44, various types of data, programs which the CPU 41 executes and the like are stored. In the HDD 44, a device managing section 441, an operation requesting information managing section 442, a device information managing section 443, a device information analyzing section 444, a device control module managing section 445, a GUI control module managing section 446, and an application control module managing section 447 are provided.

The device control section 441 manages, for each MFP connected to the network 1, device information, namely information relating to the main device 28 and the optional device 29 (for example, the manufacturers, the types, the versions, the performances, and the like), notification destination information for giving notice of predetermined information from the server 4, and information relating to the modules stored in the respective control sections, for example, by a table. Further, as notification destination information, information such as IP addresses existing on the network and an electronic mail address of the user of the MFP are managed.

In the operation requesting information managing section 442, operation requesting information which requests a predetermined operation of the user of the MFP is registered. The operation requesting information to be registered is, for example, information such as follows: information showing that a module for realizing a new function can be distributed to the MFP; information showing that, when a problem arises with respect to a function which has been built into the MFP, a module for amending the problem can be distributed; information showing that a module for various tests for maintenance of the MFP and for collecting information can be distributed; and information showing that a module, which ups the version of the program in order to improve the convenience of the operations of the MFP, can be distributed.

The device information managing section 443 receives from the user the input of information relating to devices such as the main device, the option device, or the like, which is necessary for when a module corresponding to the operation requesting information registered in the operation requesting information managing section 442 is stored in the module section 241 of the MFP. The device information managing section 443 manages the operation requesting information registered in the operation requesting information managing section 442 and the information relating to the device in an associated manner.

The device information analyzing section 444 acquires device information each predetermined period, for example, every hour, from the MFP 2 connected to the network 1 or the like, and analyzes the device information, and stores the analyzed device information in the device managing section 441. Namely, device information analyzing section 444 analyzes information relating to the configurations and the modules of the main device and the option device of the MFP which has acquired the device information, and stores the analyzed information in the device managing section 441.

The device control module managing section 445 manages a device control module which is distributed to the MFP connected to the network 1 in accordance with the operation requesting information registered in the operation requesting information managing section 442, and which is stored in the device control section.

The GUI control module managing section 446 manages a GUI control module which is distributed to the MFP connected to the network 1 in accordance with the operation requesting information registered in the operation requesting information managing section 442, and which is stored in the GUI control section.

The application control module managing section 447 manages an application control module which is distributed to the MFP connected to the network 1 in accordance with the operation requesting information registered in the operation requesting information managing section 442, and which is stored in the application control section.

Note that programs operating the units of the MFP connected to the network 1 are stored in units of modules in the respective managing sections 445, 446, and 447.

The I/F section 45 is used for connecting with external devices which read information stored in storage media, or which write information, or the like. For example, the administrator of the server 4 sets as an external device a CD-ROM on which is stored a module having a new function distributed from an agency or the like providing maintenance services for the MFP 2. Further, the administrator makes the operation requesting information and the module read from the CD-ROM correspond to one another, and stores them in at least one of the device control module managing section 445, the GUI control module managing section 446, and the application control module managing section 447.

The network communicating section 46 is connected to the network 1 via an NIC. In accordance therewith, the server 4 can communicate with computer devices such as a plurality of MFPs, a PC 3, or the like which are connected to the network 1, and can acquire, disclose, and distribute various information.

The displaying section 47 is a display such as, for example, a liquid crystal panel, a CRT, or the like, and displays information necessary for the administrator of the server 4. The inputting section 48 receives instructions from the administrator of the server 4, for example, by detecting key input from a keyboard.

Next, in the network 1 configured in this way, the administrator of the server 4 registers a new function, for example, "groupware registration", as the operation requesting information with the operation requesting information managing section 442. "Groupware registration" is a function in which a paper document is registered as electric image data by using the scanner device 281. The processing of the server 4 and the MFP 2 at this time will be described. Note that "groupware registration" is a function carried out in cooperation with an application of the PC 3 via the network 1. Further, a groupware registering module for realizing the "groupware registration" function at the MFP 2 is an application control module stored in the application control section 2413 of the MFP 2.

Figure 4:
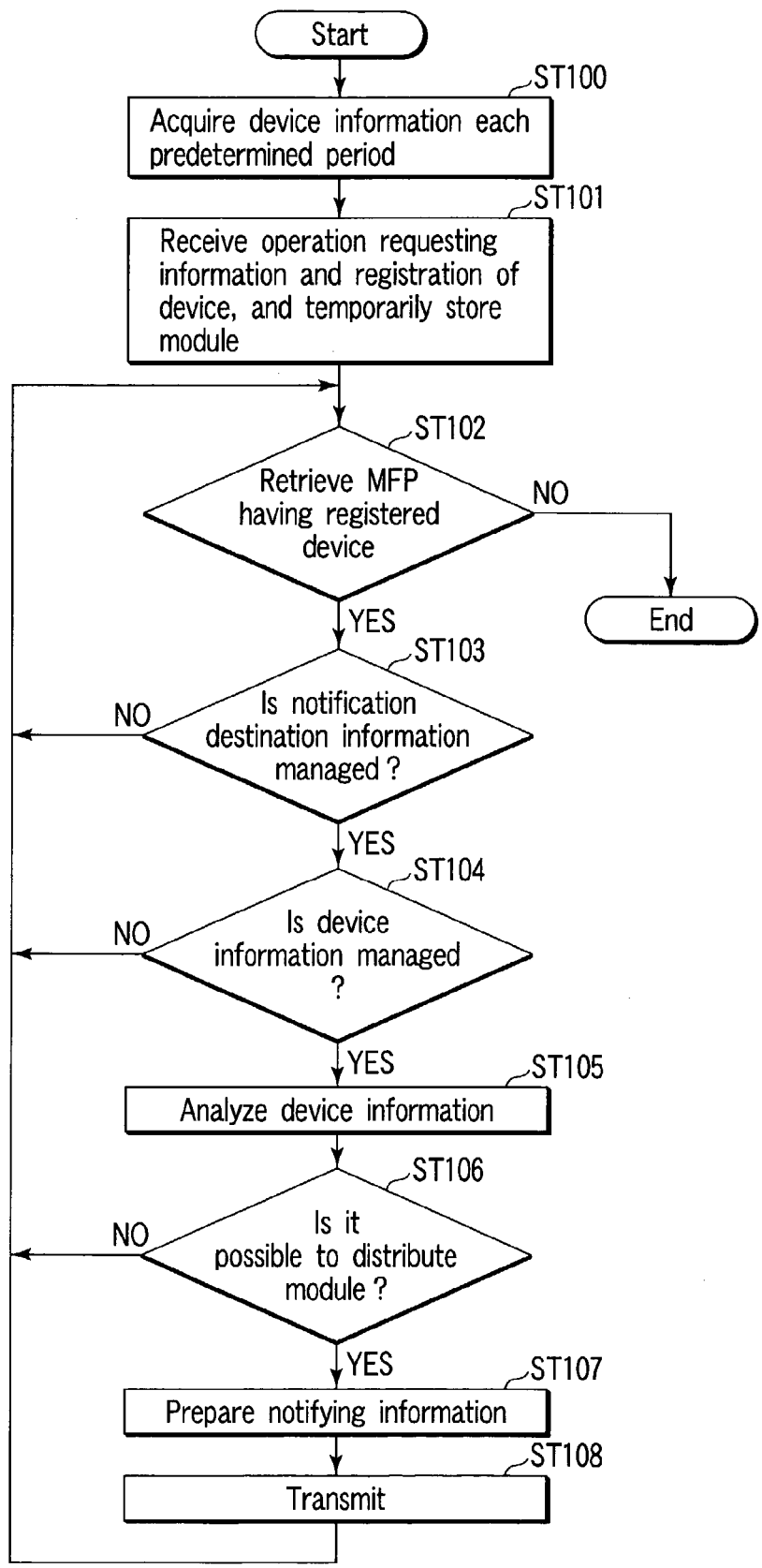
FIG. 4 is a flowchart showing processing which the server executes.

First, processings which the CPU 41 of the server 4 executes will be described with reference to FIG. 4. In step ST 100, the CPU 41 acquires device information of the MFP connected via the network 1 each predetermined period. In accordance therewith, the device information of the device managing section 441 is updated each predetermined period.

In step ST 101, the CPU 41 receives the input from the inputting section 46, and registers "groupware registration" as the operation requesting information with the operation requesting information managing section 442. Further, the CPU 41 receives a registration of a scanner device, and makes the registration correspond to the operation requesting information, and stores it in the device information managing section 443. Moreover, the groupware registering module is stored in the application control module managing section 447. Note that, in order to realize the "groupware registration" function in the MFP 2, it is necessary not only that the groupware registering module is stored in the application control section 2413, but also that the GUI module is stored in the device control section 2411 and a scan operating module is stored in the GUI control section 2412. The "groupware registration" function can be realized in the MFP 2 by relating these as one program.

In step ST 102, the CPU 41 determines whether or not the MFP, at which is provided the scanner device stored in the device information managing section 443 in accordance with the operation requesting information, has been retrieved from the device managing section 441. If the CPU 41 determines that the MFP at which the scanner device is provided has been retrieved, the processing proceeds to step ST 103. Further, if the CPU 41 determines that an MFP at which a scanner device is provided cannot be retrieved from among all of the MFPs which are managed, the processing is completed.

In step ST 103, the CPU 41 determines from the device managing section 441 whether or not notification destination information is managed in the retrieved MFP. When YES is determined in step ST 103, the processing proceeds to step ST 104, and when NO is determined, the processing proceeds to step ST 102.

In step ST 104, the CPU 41 determines whether or not the device information of the retrieved MFP is managed in the device managing section 441. When YES is determined at this step, the processing proceeds to step ST 105, and when NO is determined, the processing returns to step ST 102.

In step ST 105, the CPU 41 carries out analysis relating to the devices of the MFP retrieved on the basis of the device information of the device managing section 441 by controlling the device information analyzing section 444. At this time, the device information analyzing section 444 analyzes whether a device other than the scanner device is necessary for realizing the "groupware registration" function as well. In accordance with the analysis, in order to realize the entire "groupware registration" function, it is analyzed that a facsimile card is needed as well. Note that, in order to realize the entire "groupware registration" function, although both of a scanner device and a facsimile card are necessary, only the scanner device can limitedly realize some parts of the function. The analyzed results are stored in a predetermined area of the HDD 44 by relation with the operation requesting information.

In step ST 106, the CPU 41 determines, on the basis of the analyzed results, whether or not the groupware registering module can be distributed to the retrieved MFP. Namely, whether a facsimile card is provided in the option device is determined. In accordance therewith, it is possible to avoid notifying to an MFP, which cannot realize the entire "groupware registration" function, that the "groupware registration" function has been disclosed. When YES is determined at this step, the processing proceeds to step ST 107, and when NO is determined, the processing returns to step ST 102.

In step ST 107, the CPU 41 prepares notifying information showing that the "groupware registration" function has been disclosed. Note that, if the notification destination information is an IP address of the MFP, notifying information showing that a new function has been disclosed is prepared on a displaying section such as a touch panel section of the MFP. If the notification destination information is the URL of the personal computer of the user managing the MFP, an electronic mail stating that a new function has been disclosed is prepared.

In step ST 108, the CPU 41 transmits the prepared notifying information to the retrieved MFP or the personal computer of the user of the MFP. Further, the processing proceeds to step ST 102, and carries out searching for other MFPs.

Next, processing which the CPU 21 of the MFP 2 executes when the MFP 2 receives from the server 4 the notifying information showing that the "groupware registration" function has been disclosed will be described with reference to FIG. 5.

In step ST 201, when the CPU 21 receives notifying information showing that the "groupware registration" function has been disclosed, the CPU 21 stores the notifying information, for example, in a predetermined area of the HDD 24.

Figure 8:
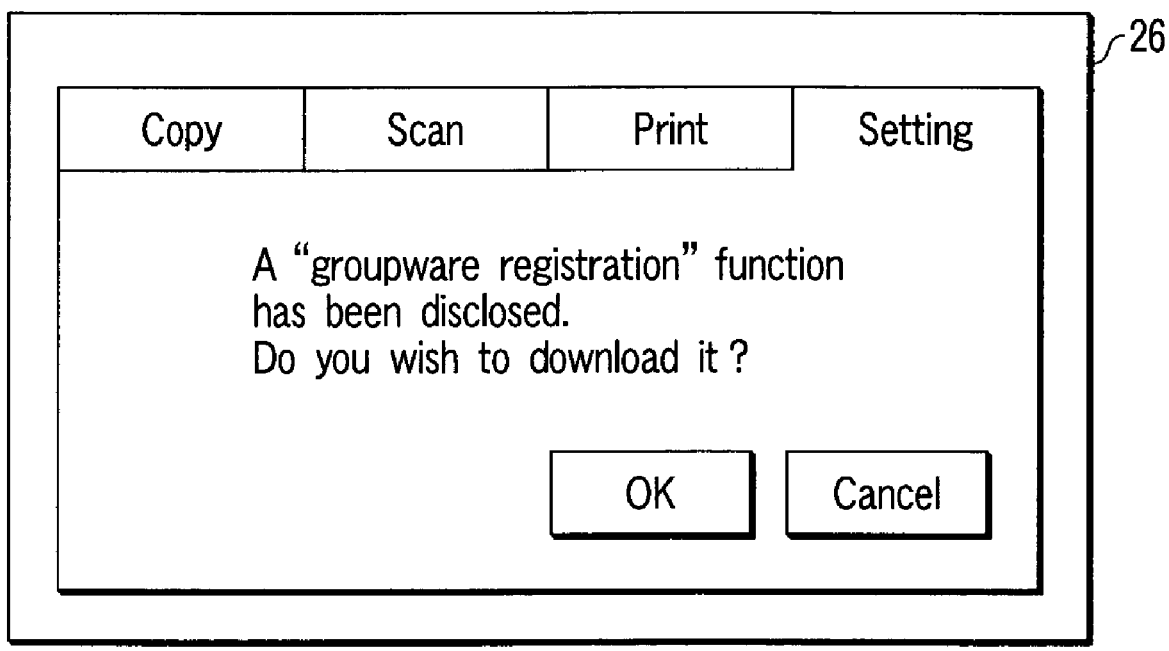
FIG. 8 is a diagram showing one example of a display when a new function is disclosed.

In step ST 202, the CPU 21 displays the aforementioned notifying information on the touch panel section 26, for example, as shown in FIG. 8. Note that the display may be displayed immediately after receiving the notifying information. However, the display may be displayed after receiving a predetermined operation at a time desired by the user. In accordance therewith, the user of the MFP 2 can be informed that the "groupware registration" function has been disclosed.

In step ST 203, the CPU 21 receives the input of the touch panel section 26, and determines whether or not the operation requesting distribution of the program for realizing the "groupware registration" function has been received. Namely, as shown in the drawing, the CPU 21 determines whether either of "OK" or "Cancel" has been touched. When it is determined that an input requesting distribution of the program has been carried out, the processing proceeds to step ST 204. When it is determined that an input which does not request distribution of the program has been carried out, for example, processing in which the notifying information is eliminated from a predetermined area or the like has been carried out, the processing is completed.

In step ST 204, the CPU 21 reads the information and the device information managed in the device information managing section 242, and temporarily stores them. At this time, information showing whether communication with the groupware, which is an application built in the PC 3, can be carried out or not is simultaneously stored.

In step ST 205, the CPU 21 transmits to the server 4 via the network 1 the distribution requesting information requesting distribution of the program and the information temporarily stored in the work area.

Note that, when the notifying information is transmitted to the user of the MFP 2, the MFP does not carry out the processing of steps ST 201, ST 202, and ST 203. The processing of step ST 204 is processing which receives the operation requesting distribution of the program for realizing the "groupware registration" function, and which reads the device information at a predetermined area and temporarily stores it, and in step ST 205, the processing is processing which transmits the distributing request of the program and the device information to the server 4.

Figure 6:
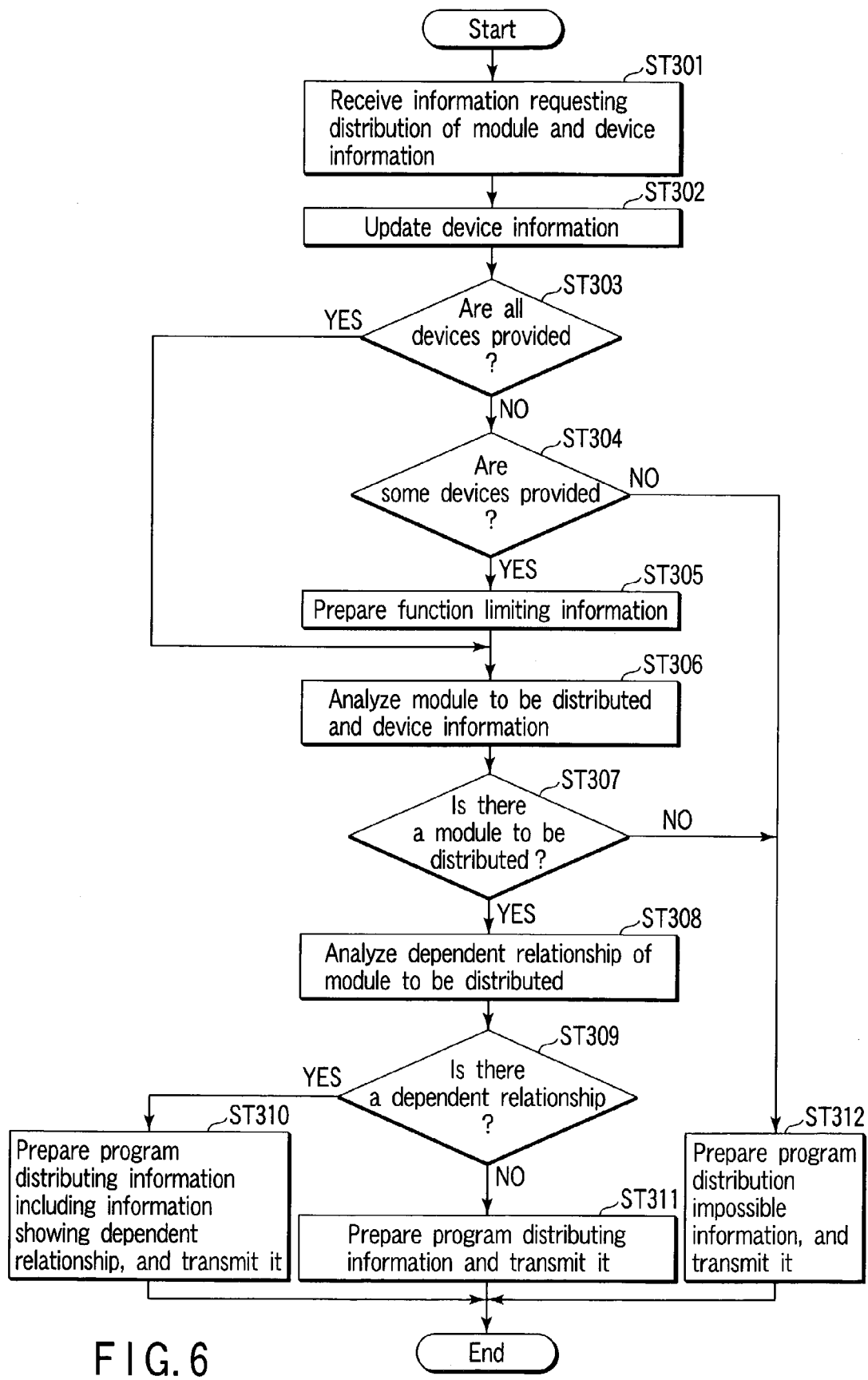
FIG. 6 is a flowchart showing some other processing which the server executes.

Next, processing which the CPU 41 executes when the server 4 receives the device information along with distribution requesting information from the MFP 2 will be described with reference to FIG. 6.

In step ST 301, when the CPU 41 receives the device information along with the distribution requesting information requesting distribution of the program via the network 1, the CPU 41 temporarily stores this information in a predetermined area.

In step ST 302, the CPU 41 updates the device information of the MFP 2 managed in the device managing section 441 on the basis of the temporarily stored device information. In accordance therewith, even if the server 4 is configured to acquire information relating to the MFP 2 each predetermined period, the server 4 can acquire the latest device information of the MFP 2 when distribution of the program is requested from the MFP 2.

In step ST 303, the CPU 41 determines whether or not all of the units which can realize the "groupware registration" function are provided, on the basis of the updated device information. Namely, the CPU 41 reads from a predetermined area that the scanner device 281 and the facsimile card 291 are necessary, in a relation to correspond to the operation requesting information. Further, the CPU 41 determines whether or not the scanner device 281 and the facsimile card 291 are provided in the MFP 2 on the basis of the updated device information. At this step, when YES is determined, the processing proceeds to step ST 306, and when NO is determined, the processing proceeds to step ST 304.

In step ST 304, the CPU 41 determines, from the updated device information, whether the scanner device 281 is provided or not. Namely, the CPU 41 determines that it is a device configuration in which only some parts of the "groupware registration" function can be executed. At this time, when YES is determined, the processing proceeds to step ST 305, and when NO is determined, the processing proceeds to step ST 312.

In step ST 305, the CPU 41 prepares function limiting information showing how the disclosed module is to be limited. In the case of the "groupware registration" function, when the scanner device 281 is provided and a facsimile card 291 is not provided, information, in which the functions of registering image data with the groupware and simultaneously transmitting the image data by a facsimile are limited, is prepared. This information is stored in a predetermined area of the HDD 44. Note that, although the functions are limited, if there is a function which can be used as a substitution by using the function of another device, information relating to the substitute function as well is included in the function limiting information.

In step ST 306, the CPU 41 controls the device information analyzing section 444. The device information analyzing section 444 analyzes the module configuration of the MFP 2 from the analysis of the groupware registering module registered with the application control module managing section 447 and the updated device information. First, the groupware registering module is analyzed, and what type of module is necessary for realizing the "groupware registration" function by the MFP 2 is analyzed. In accordance with the analysis, it is analyzed that a scan operation control module is necessary for the device control section 2411 of the MFP 2, and a scan GUI module is necessary for the GUI control section 2412. Further, the CPU 41 analyzes the module configuration of the MFP 2 from the updated device information.

In step ST 307, the CPU 41 determines whether or not the module is a module to be distributed for realizing the "groupware registration" function to the MFP 2 on the basis of the aforementioned analyzed results. At this time, when YES is determined, the processing proceeds to step ST 308, and when NO is determined, the processing proceeds to step ST 312. Note that, when information which cannot carry out communication with the groupware which is an application built into the PC 3 is acquired, the CPU 41 determines that there is no module to be distributed to the MFP 2.

Figure 9:
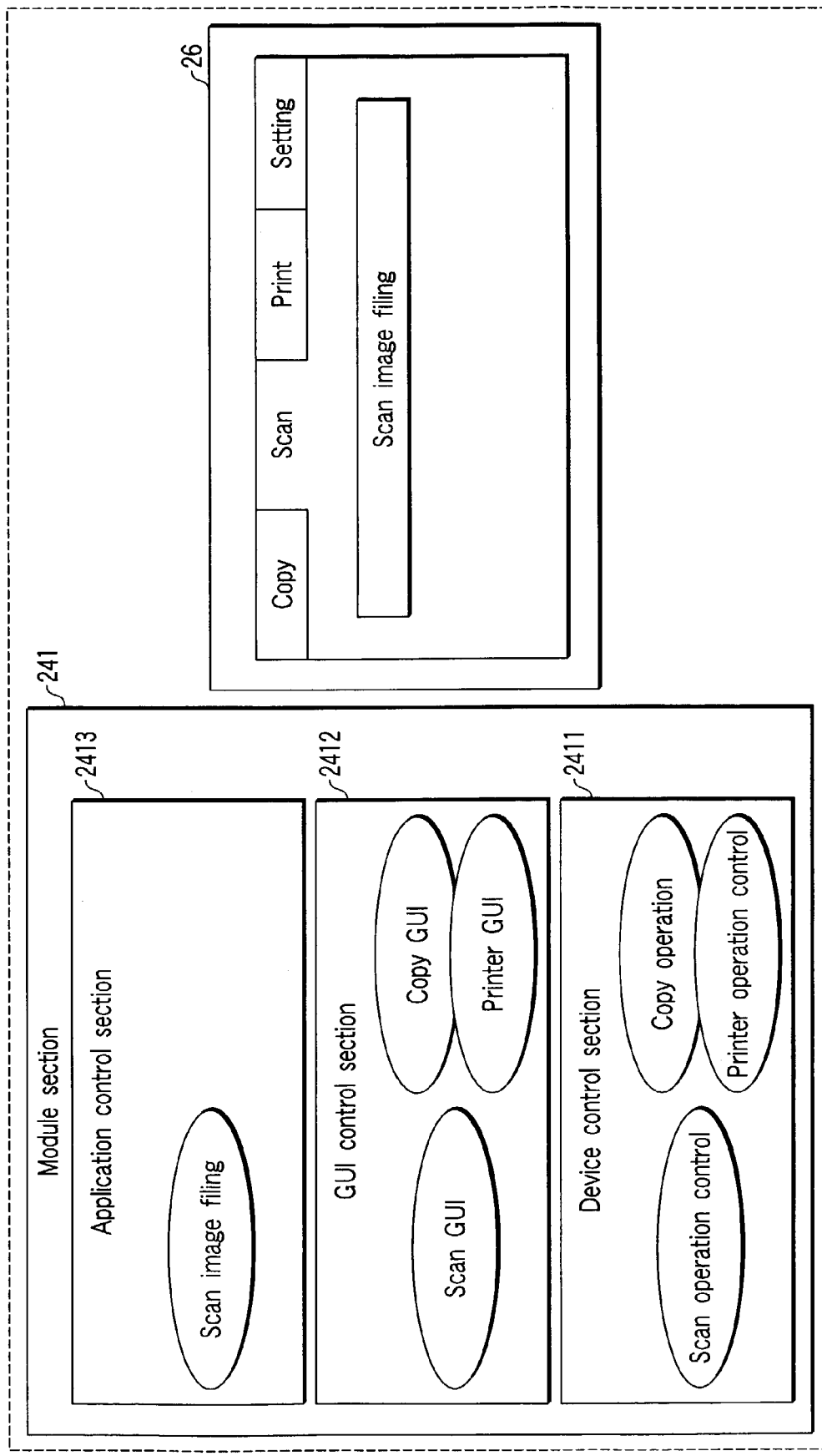
FIG. 9 is a diagram showing an example of storing module and an example of displaying on a touch panel.

The analysis of the module of step ST 306 and the determination of the module of step ST 307 will be described with reference to FIG. 9 and FIG. 10. For example, as displayed on the touch panel section 26 in FIG. 9, it is supposed that the MFP 2 has a "scan image filing" function. The configuration of the module section 241 of a program for realizing the "scan image filing" function is a configuration in which the scan operation control module is stored in the device control section 2411, and the scan GUI module is stored in the GUT control section 2412, and a scan image filing module is stored in the application control section 2413. The "scan image filing" is executed due to the three modules being operated as one program. In this way, when it is analyzed that the scan operation control module and the scan GUT module have already been stored in the MFP 2, the module to be distributed is determined to be the groupware registering module.

Figure 10:
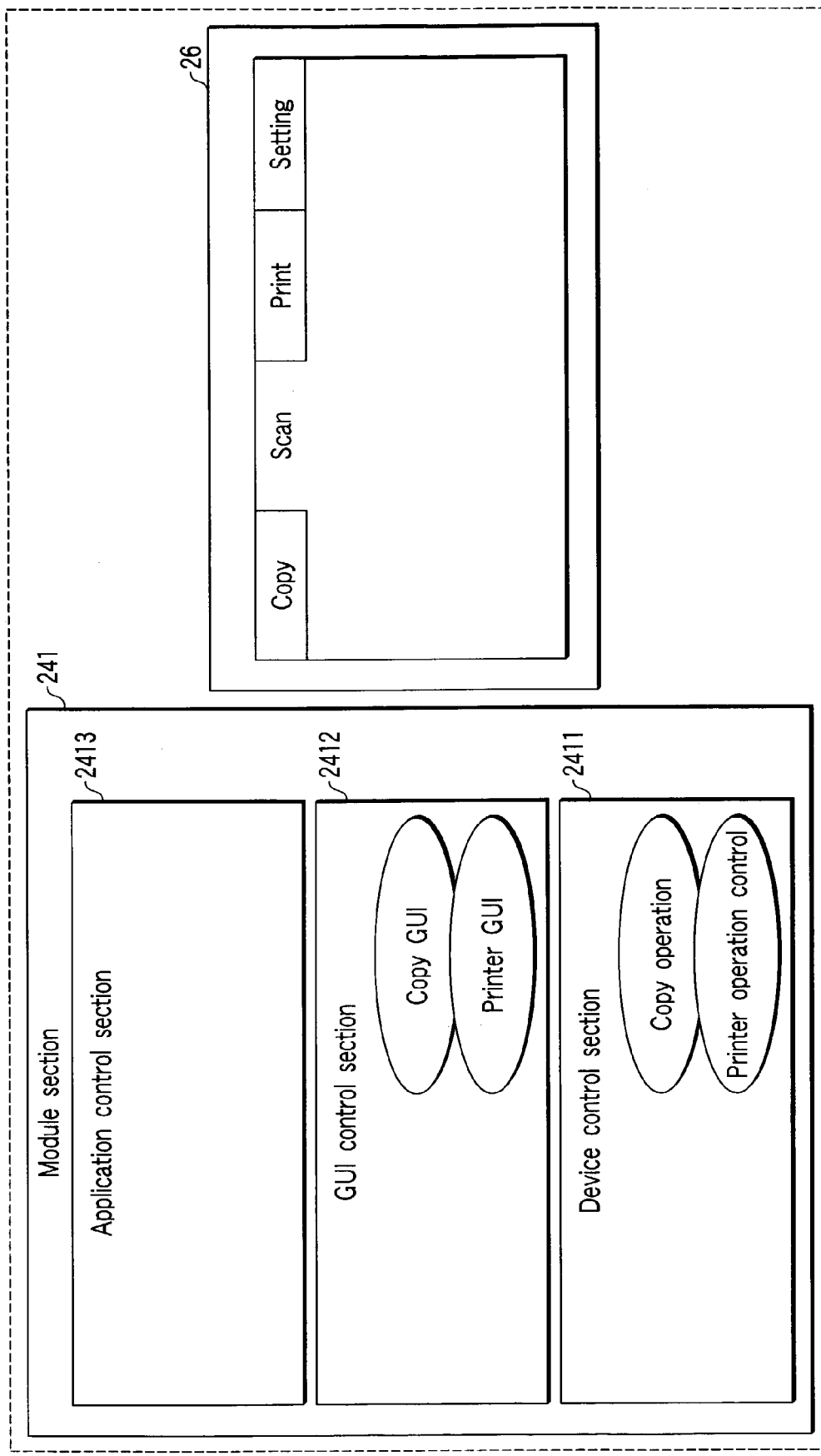
FIG. 10 is a diagram showing another example of storing module and another example of displaying on the touch panel.

Further, for example, as displayed on the touch panel section 26 in FIG. 10, there are cases in which, although there is the item "scan", there is no function thereof. At this time, in the configuration of the module section 241, modules relating to a scanner are not stored in any of the device control section 2411, the GUT control section 2412, and the application control section 2413. In this way, when it is analyzed that the modules section 241 has no module of the program for realizing the "groupware registration" function at all, the modules to be distributed are determined to be the scan GUT module, the groupware registering module, and the scan operation control module.

In step ST 308, the CPU 41 analyzes, on the basis of the updated device information, whether or not there is a dependent relationship between the module to be distributed and the other programs of the MFP 2 when the module to be distributed is built into the MFP 2 as one program functioning as "groupware registration". There are cases in which some of the modules stored in the respective hierarchies of the module section 241 of the MFP 2 are used not only for a specific program, but are commonly used with other programs. For example, in the case shown in FIG. 9, in order to realize the "groupware registration" function by distributing the groupware registering module, it is necessary to build in the scan GUI module and the scan operation control module as one program. In this case, it is analyzed that there is a dependent relationship with the program which makes the "scan image filing" function.

In step ST 309, the CPU 41 determines, on the basis of the analyzed results, whether or not the module to be distributed has a dependent relationship with the other programs of the MFP 2. At this step, when YES is determined, the processing proceeds to step ST 310, and when NO is determined, the processing proceeds to step ST 311.

In step ST 310, the CPU 41 prepares program distributing information including dependent relationship information showing the existence of a program having a dependent relationship with the module, and function limiting information when a module and function limiting information are prepared, and transmits the program distributing information to the MFP 2.

In step ST 311, the CPU 41 prepares program distributing information including function limiting information when the module and the function limiting information which are determined to be distributed are prepared, and transmits the program distributing information to the MFP 2.

In step ST 312, the CPU 41 prepares program distribution impossible information expressing that the groupware registering module for realizing the "groupware registration" function cannot be distributed, and transmits it to the MFP 2. Note that, there are the cases of step ST 304 and ST 307 in which program distribution impossible information is prepared. Therefore, the program distribution impossible information may be prepared so as to include information as to for what reasons the program cannot be distributed.

In this way, the server 4 prepares the program distributing information or the program distribution impossible information for the distribution requesting information from the MFP 2, and transmits it to the MFP 2.

Next, processings which is executed when the CPU 21 of the MFP 2 receives the program distributing information or program distribution impossible information will be described with reference to FIG. 7.

In step ST 401, the CPU 21 receives the program distributing information or program distribution impossible information from the server 4, and stores this information in a predetermined area.

In step ST 402, the CPU 21 determines whether the information stored in the predetermined area is program distributing information or not. At this step, when NO is determined, the processing proceeds to step ST 403, and when YES is determined, the processing proceeds to step ST 404.

In step ST 403, the CPU 21 carries out a display expressing that the "groupware registration" function cannot be added on the touch panel section 26 on the basis of the program distribution impossible information. For example, in the program distribution impossible information, there are cases when communication cannot be carried out with the groupware provided in a personal computer. In accordance therewith, the reason why a new function cannot be added can be notified to the user.

In step ST 404, the CPU 21 determines whether or not function limiting information is included in the program distributing information stored in the predetermined area. At this step, when YES is determined, the processing proceeds to step ST 405, and when NO is determined, the processing proceeds to step ST 406.

In step ST 405, the CPU 21 displays on the touch panel section 26 the function distributing information stored in the predetermined area. Namely, the CPU 41 displays that some parts of the "groupware registration" function are limited.

In step ST 406, the CPU 21 determines whether dependent relationship information is included in the program distributing information or not. At this determination, when YES is determined, the processing proceeds to step ST 407, and when No is determined, the processing proceeds to step ST 409.

In step ST 407, the CPU 21 displays on the touch panel section 26 the dependent relationship information showing a dependent relationship with other programs. As shown in FIG. 9, when the MFP 2 has the "scan image filing" function, messages such as, for example, "A groupware registration function has been added. Please verify that the scan image filing function is not operating" or the like are displayed on the touch panel section 26.

Figure 11:
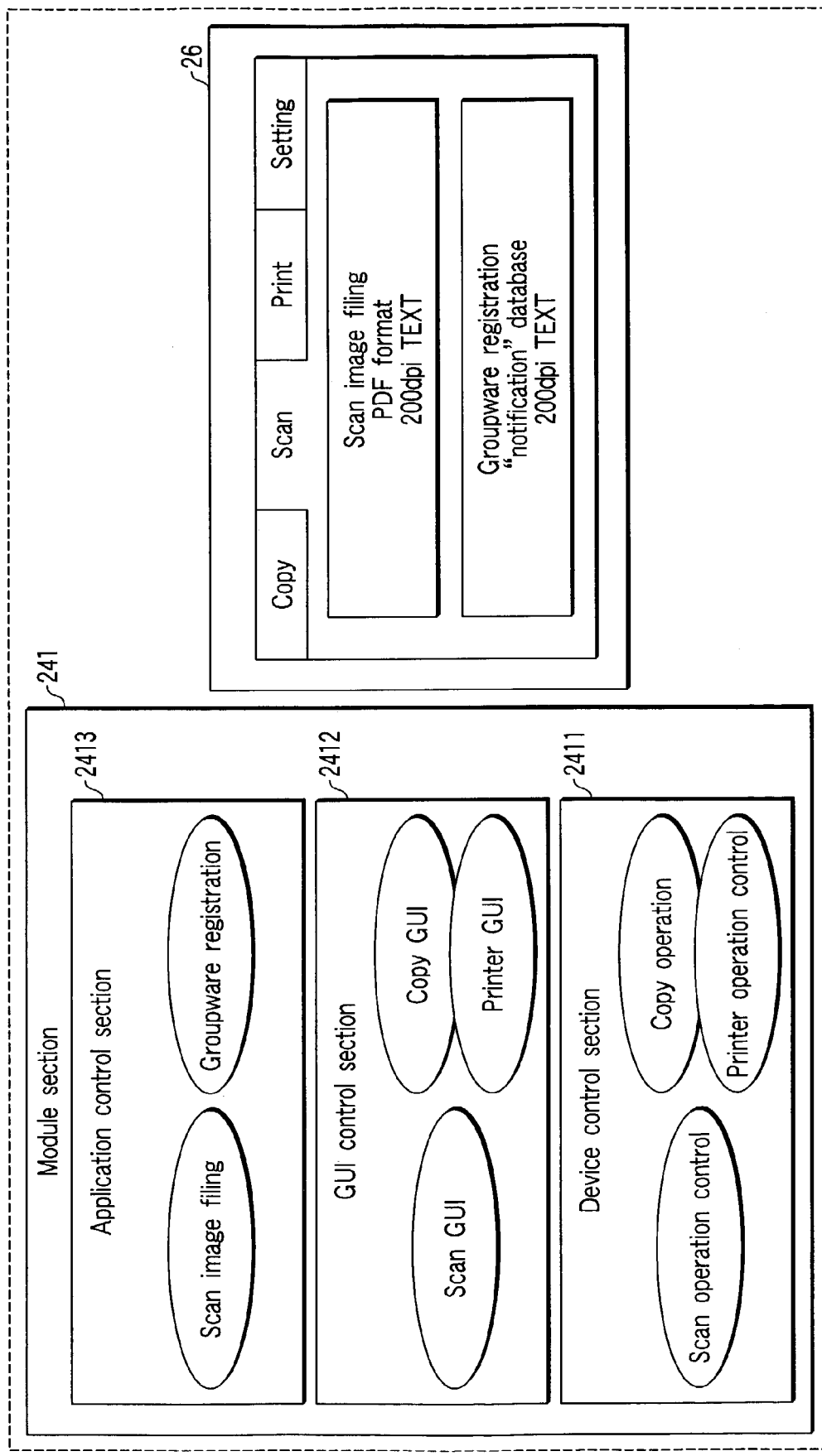
FIG. 11 is a diagram showing a case where a function is added to FIG. 9.

In step ST 408, the CPU 21 receives a predetermined operation from the user of the MFP 2. For example, an input of "OK" is received with respect to the aforementioned message displayed on the touch panel section 26. By receiving the input, as shown in FIG. 11, the CPU 21 stores the groupware registering module included in the program distributing information in the application control section 2413.

Further, the groupware registering module is made to correspond to the scan operation control module and the scan GUI module as one program making the "groupware registration" function. In accordance therewith, as shown in the drawing, the "groupware registration" function is displayed on the touch panel section 26.

In step ST 409, the CPU 21 immediately stores the module on the basis of the program distributing information stored in a predetermined area. At this time, because the module stored in the module section 241 has no dependent relationship with the other programs, problems do not arise even if the image forming apparatus carries out any type of operation. For example, as shown in FIG. 10, when no module which is necessary for the program for realizing the "groupware registration" function is stored at all in the MFP 2, the scan GUI module, the scanner operation control module, and the groupware registering module are included in the program distributing information. Further, as shown in FIG. 12, the scan operation control module is stored in the device control section 2411, and the scan GUI module is stored in the GUI control section 2412, and the groupware registering module is stored in the application control section 2413, such that the respective modules are made to correspond to one another as one program making the "groupware registration" function. In accordance therewith, as shown in the drawing, the "groupware registration" function is displayed on the touch panel section 26.

In step ST 410, the CPU 21 informs the touch panel section 26 of information showing that the distribution of the program for realizing the "groupware registration" function has been completed. In accordance therewith, the user can be exactly notified that the new function has become available for use in the MFP 2.

In this way, the addition of the "groupware registration" function from the server 4 to the MFP 2 is carried out. Further, the MFP 2 receives an operation from the user, and can carry out "groupware registration" in the PC 3 connected to the network 1.

In accordance with the embodiment, when a function which can be newly added to the MFP is disclosed to the server 4, the MFP 2 receives, via the network 1, program distributing information which includes a module for realizing the function without other machines being interposed. Further, when the distributed module has no dependent relationship with other programs, the MFP can immediately store the distributed module in the module section 241 without the operations of the other devices being stopped.

Further, when the server 4 distributes the program distributing information, in a case where the program distributing information is already built into the MFP among the modules of the respective hierarchies realizing the program, program distributing information which does not include that module is distributed. In accordance therewith, the burden on the network can be reduced.

Moreover, when distribution of the program is requested from the MFP 2, the server 4 can acquire the device information of the MFP 2. Accordingly, even if it is a configuration in which the device information of the MFP is acquired each predetermined period, when distribution of the program is requested, it can be determined whether there is approval or disapproval of distribution of the program by the configuration of the latest device and the configuration of the module section.

In the above-described embodiment, a case where a new function is disclosed at the server 4 has mainly been described. However, of course, the present invention can be applied to a case where information showing that a module correcting problems can be distributed is registered as a firmware correcting addition, and information showing a module for various tests for maintenance of the MFP and for collecting information can be distributed is registered as a diagnostic program addition, and information showing that a module upping the version of the program in order to improve the convenience of operations of the MFP can be distributed is registered as a customized GUI addition.

Figure 13:
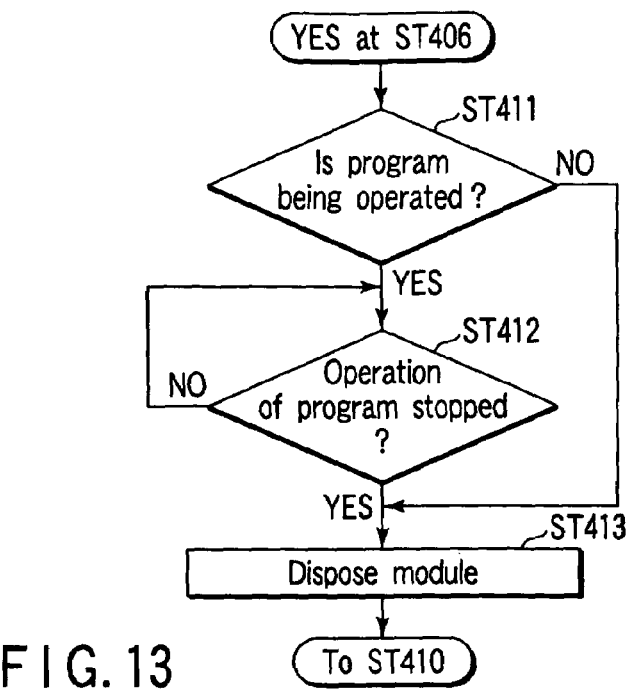
FIG. 13 is a flowchart showing a modified example of processing which the MFP executes.

Note that, in steps ST 407 and ST 408, the CPU 21 displays the dependent relationship information on the touch panel section 26, and receives operations from the user, and stores the module included in the program distributing information. However, the processing shown in FIG. 13 may be carried out in place of this configuration. The CPU 21 determines whether a program having a dependent relationship is operating or not (ST 411). Further, when the program is not being operated, the CPU 21 immediately stores the module (ST 413). When the program is being operated, at any time when the program becomes in a dormant state, the time when there is no job to be executed, the time during initializing processing when the device is rebooted, or the like (ST 412), the CPU 21 stores the module (ST 413). Further, the above-described two settings are provided as modes in the mode setting section 244, and the modes may be able to be set by selections of the user.

Figure 14:
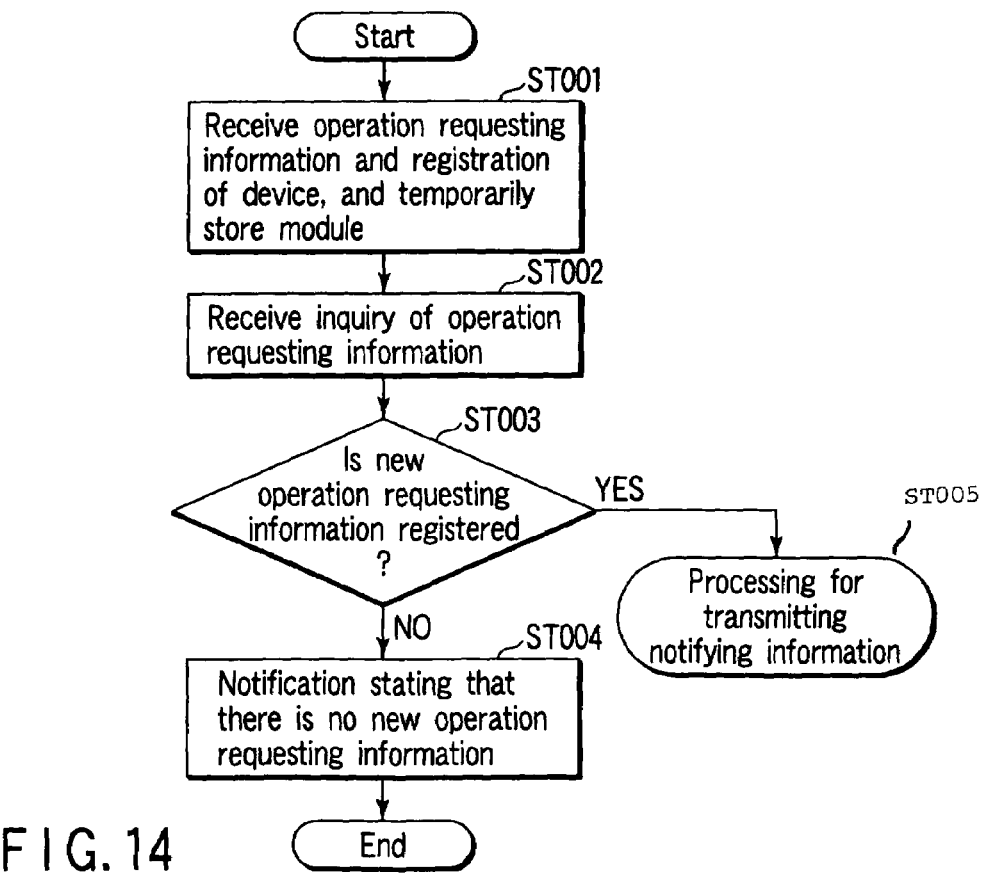
FIG. 14 is a flowchart showing yet some other processing which the server executes.

Further, the embodiment is configured such that the operation requesting information is registered with the server 4, and thereafter, the MFP corresponding to the request is notified that the new function has been disclosed. However, the present invention is not limited to this configuration. Namely, as shown in FIG. 14, operation requesting information and registrations of devices are received at the server 4, and the modules are stored (ST 001). Further, at some opportunity, the device managing section 441 receives from the MFP 2 an inquiry as to the operation requests registered in the operation requesting information managing section 442 (ST 002). Furthermore, the MFP 2 determines whether or not an operation requesting information for which there has not been an inquiry is registered with the operation requesting information managing section 442 (ST 003). At this determination, when YES, processing for transmitting the notifying information which was described above is carried out (ST 005). In addition, when NO, a notification expressing that there is no new operation requesting information is carried out (ST 004). Note that opportunities for inquiring as to the presence or absence of the operation requesting information in the server 4 from the MFP 2 are, for example, when the MFP is started, when a predetermined operation is carried out by the user of the MFP 2, when it is determined that a regular period has passed by the clock section 27 in the interior of the MFP 2, or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A program distributing method of a program distributing source, comprising:

acquiring information relating to respective units composing image forming apparatuses and information relating to modules in which programs for realizing functions of the respective units are stored each predetermined hierarchy, via a network and each predetermined period and for each image forming apparatus connected to the network;

receiving a module operating the unit, operation requesting information requesting an operation of whether distribution of the module is necessary or not to the respective image forming apparatus, and information of a device which is necessary for realizing a function of the module;

determining whether or not each image forming apparatus is configured to be able to realize the function of the module;

transmitting notifying information describing contents that an operation of requesting distribution of the module to the image forming apparatus configured to be able to realize the module function by the determination is to be carried out, the notifying information indicating that a new function of the module has been disclosed;

receiving distribution requesting information requesting distribution of the module from the image forming apparatus to which the notifying information has been transmitted;

preparing program distributing information including the module operating the unit, and transmitting the program distributing information to the image forming apparatus to which the distribution has been requested, wherein the distribution requesting information further includes device information, when the distribution requesting information including the device information is received, carrying out a determination as to whether or not the image forming apparatus is configured to be able to realize the function of the module, on the basis of the new device information;

transmitting the program distributing information including the module to the image forming apparatus when it is determined that the image forming apparatus is configured to be able to realize the function of the module by the determination; and preparing dependent relationship information showing a dependent relationship when the module has a dependent relationship with the modules stored in the respective hierarchies on the basis of the new device information, wherein the program distributing information further includes the dependent relationship information.

2. A method according to claim 1, further comprising preparing function limiting information expressing that only some functions operate even when the module is stored on the basis of the new device information, wherein the program information further includes the function limiting information.

3. A program distributing method of a program distributing source, comprising:

acquiring information relating to respective units composing image forming apparatuses and information relating to modules in which programs for realizing functions of the respective units are stored per predetermined hierarchy, at each predetermined period and for each image forming apparatus connected to the network;

receiving a module operating the unit, operation requesting information requesting an operation of whether distribution of the module is necessary or not to the respective image forming apparatus, and information of a device which is necessary for realizing a function of the module;

receiving inquiry information inquiring whether or not the module operating the unit is newly registered at the program distributing source, via the network from the image forming apparatus;

determining whether or not each image forming apparatus having received the inquiry information is configured to be able to realize the function of the module;

transmitting, to the image forming apparatus, notifying information having described therein the contents that an operation of requesting distribution of the module to the image forming apparatus is to be carried out, when it is determined that the image forming apparatus is configured to realize the module function by the determination, the notifying information indicating that a new function of the module has been disclosed;

receiving distribution requesting information requesting distribution of the module from the image forming apparatus to which the notifying information has been transmitted;

preparing program distributing information including the module operating the unit, and transmitting the program distributing information to the image forming apparatus at which the distribution has been requested.

wherein the distribution requesting information further includes device information, carrying out a determination as to whether or not the image forming apparatus is configured to be able to realize the function of the module, on the basis of the new device information, when the distribution requesting information including the device information is received;

transmitting the program distributing information including the module to the image forming apparatus when it is determined that the image forming apparatus is configured to be able to realize the function of the module by the determination; and preparing dependent relationship information showing a dependent relationship when the module has a dependent relationship with the modules stored in the respective hierarchies on the basis of the new device information, the program distributing information further including the dependent relationship information.

4. A method according to claim 3, further comprising preparing function limiting information expressing that only some functions operate even when the module is stored on the basis of the new device information, the program information further including the function limiting information.

5. An image forming apparatus comprising:

a module section which stores a program for realizing functions of respective units composing the image forming apparatus so as to be divided into modules corresponding to each predetermined hierarchy;

a device information managing section which stores information relating to the modules stored in the module section and information relating to the units;

a connecting section which receives a program including modules, which operate the units connected to a network, from an exterior, the connecting section transmitting operation requesting information requesting an operation of whether distribution of a module operating the unit is necessary or not to the respective image forming apparatuses, and information of a device which is necessary for realizing a function of the module, and receiving notifying information having described therein contents that an operation of requesting distribution of the module configured to be able to realize the function is to be carried out, the notifying information including information that a new function of the module has been disclosed;

an informing section which informs contents of the notifying information, when the notifying information is received from the connecting section;

an operating section which receives an operation of transmitting, to a program distributing source, distribution requesting information requesting distribution of the modules;

an information analyzing section which, when program distributing information including the modules is received from the exterior via the connecting section, analyzes to which hierarchy of the module section a module included in the program distributing information is stored, and stores the module on the basis of the analyzed results;

a determination section which determines whether or not function limiting information is included in the program distributing information; and a display section which displays the function limiting information based on the determination of the determination section as the function limiting information being included.

6. An image forming apparatus comprising:

a module section which stores a program for realizing functions of respective units composing the image forming apparatus so as to be divided into modules corresponding to each predetermined hierarchy;

a device information managing section which stores information relating to the modules stored in the module section and information relating to the units;

a connecting section which receives a program including modules, which operate the units connected to a network, from an exterior, the connecting section transmitting operation requesting information requesting an operation of whether distribution of a module operating the unit is necessary or not to the respective image forming apparatuses, and information of a device which is necessary for realizing a function of the module, and receiving notifying information having described therein contents that an operation of requesting distribution of the module configured to be able to realize the function is to be carried out, the notifying information including information that a new function of the module has been disclosed;

an informing section which informs contents of the notifying information, when the notifying information is received from the connecting section;

an operating section which receives an operation of transmitting, to a program distributing source, distribution requesting information requesting distribution of the modules;

an information analyzing section which, when program distributing information including the modules is received from the exterior via the connecting section, analyzes to which hierarchy of the module section a module included in the program distributing information is stored, and stores the module on the basis of the analyzed results;

a determination section which determines whether or not dependent relationship information is included in the program distributing information, the dependent relationship information showing a dependent relationship with other programs; and a display section which displays the dependent relationship information based on the determination of the determination section as the dependent relationship information being included.

* * * * *